(12) United States Patent
M'Zoughi et al.

(10) Patent No.: US 7,197,618 B2
(45) Date of Patent: Mar. 27, 2007

(54) METHOD AND DEVICE FOR DISTRIBUTING OBJECTS IN A HETEROGENEOUS GROUP OF DATA STORAGE DEVICES

(75) Inventors: Abdelaziz M'Zoughi, Mons (FR); Christophe Guittenit, Toulouse (FR)

(73) Assignee: Storagency, Colomiers (FR)

( * ) Notice: Subject to any disclaimer, the term of this patent is extended or adjusted under 35 U.S.C. 154(b) by 467 days.

(21) Appl. No.: 10/498,372

(22) PCT Filed: Dec. 13, 2001

(86) PCT No.: PCT/FR02/04351

§ 371 (c)(1), (2), (4) Date: Jun. 10, 2004

(87) PCT Pub. No.: WO03/054735

PCT Pub. Date: Jul. 3, 2003

(65) Prior Publication Data

US 2005/0033749 A1 Feb. 10, 2005

(30) Foreign Application Priority Data

Dec. 14, 2001 (FR) .................................. 01 16204

(51) Int. Cl.
*G06F 12/00* (2006.01)
(52) U.S. Cl. ..................................................... 711/170
(58) Field of Classification Search ................. 711/170
See application file for complete search history.

(56) References Cited

U.S. PATENT DOCUMENTS 5,333,315 A 7/1994 Saether et al.
6,330,621 B1 12/2001 Blendermann et al.

OTHER PUBLICATIONS

Wang Y et al.: "Weighted striping in multimedia servers" Multimedia Computing and Systems '97. Proceedings., IEEE International Conference on Ottawa, Ont., Canada Jun. 3-6, 1997, Los Alamitos, CA, USA, IEEE Comput. Soc, US, Jun. 3, 1997, pp. 102-109, XP010239178 ISBN: 0-8186-7819-4 p. 102, colonne de gauche, ligne 1 -p. 102, colonne de droite, ligne 14 p. 106, colonne de droite, alinea 3 -p. 107, colonne de gauche, alinea 3.

*Primary Examiner*—Jack A. Lane
(74) *Attorney, Agent, or Firm*—Young & Thompson

(57) ABSTRACT

Method for distributing objects in a heterogeneous group of data storage devices includes breaking down each object into a plurality of blocks, distributing the blocks in different storage devices in accordance with a distribution law which consists in distributing in each of the storage devices pieces of objects consisting each of one or of a plurality of blocks. The parameter used for managing the distribution of the pieces of objects is a flexibility coefficient CF(i), representing the difference between the weights of the pieces of the object (i). Values representing the variability in the popularity of each object are periodically measured and calculated; for each object, a desired flexibility coefficient CFv(i) to be assigned to the object is calculated from said values measured or calculated at instant (t), in accordance with a principle.

8 Claims, 2 Drawing Sheets

Figure 1:
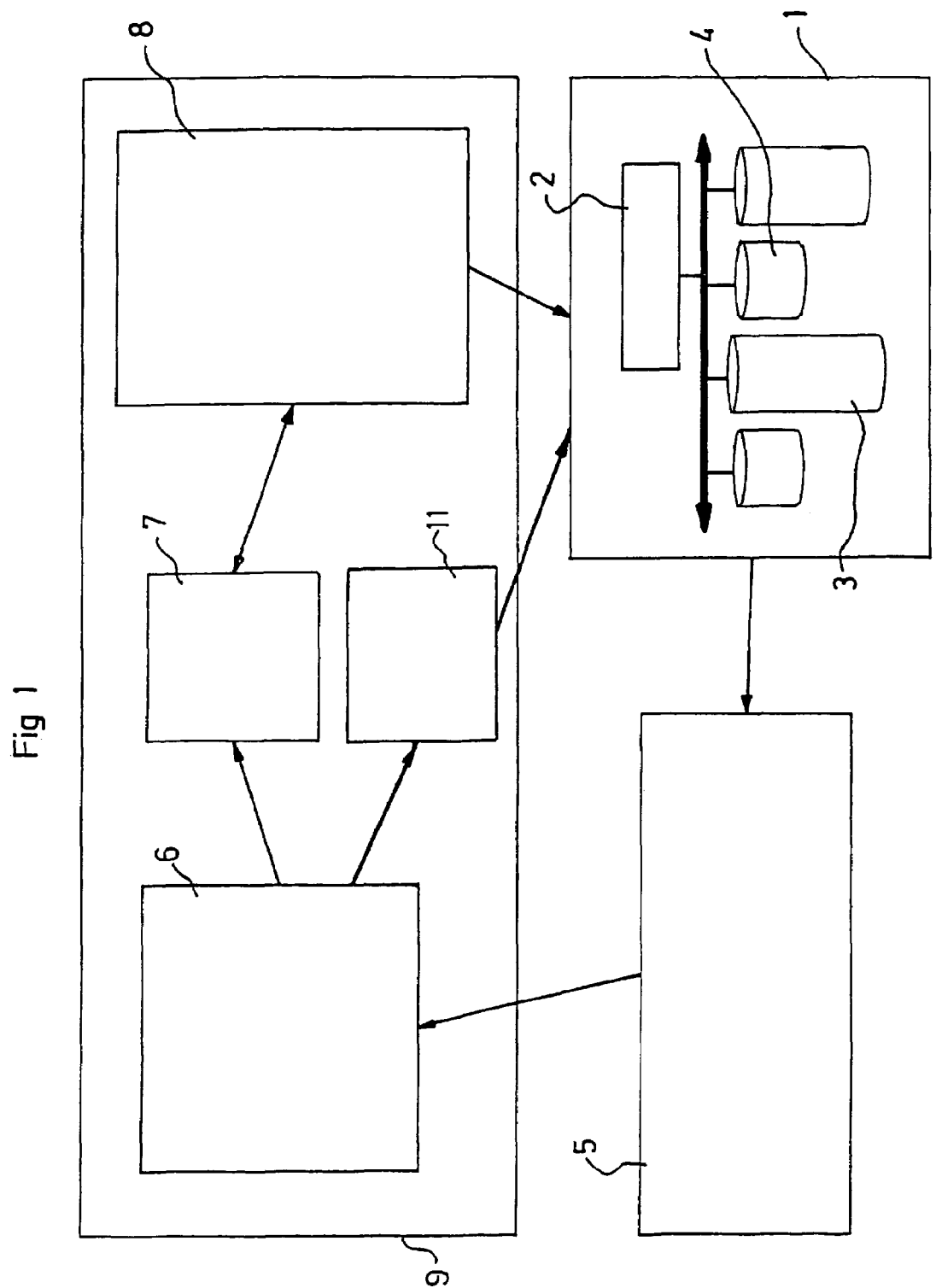

METHOD AND DEVICE FOR DISTRIBUTING OBJECTS IN A HETEROGENEOUS GROUP OF DATA STORAGE DEVICES

The invention relates to a method and a device for distributing objects in a heterogeneous group of data storage devices.

The present tendency in the field of data storage devices is to store information in increasingly complex storage systems, called heterogeneous storage systems because they consist of storage devices which do not have the same storage capacity (the quantity of information which can be stored in a storage device) or the same bandwidth (the rate at which the information can be read from or written to a storage device).

Conventionally, the first step towards the storage of information in the different storage devices consists, at the present time, in dividing each object into a plurality of blocks and in distributing said blocks in the different storage devices according to a distribution law consisting in the distribution in each of the storage devices of pieces of objects, each consisting of one or a plurality of blocks.

For the sake of clarity, the following terminology is used throughout the text (description and claims):
storage device: device for recording or retrieving data;
client: device which accesses the data stored in the storage devices;
popularity of a set of data: value proportional to the quantity of data transferred per unit of time between the storage devices and the clients when this set of data is accessed;
variability in popularity: value characterizing the variations in popularity of a set of data over time;
block: set of data stored contiguously in a storage device;
object: set of blocks having comparable variability of popularity;
piece of an object: set of blocks all belonging to the same object and placed in the same storage device;
load of a storage device: set of data transferred between this storage device and the clients per unit of time;
weight of a piece: value representing the workload due to this piece in the storage device which stores this piece. This value can be assessed in a number of ways, for example as the size of the piece divided by the mean bandwidth of the storage device, as the mean time taken by the storage device to process the read or write requests for the data in this piece, and so on.

All developments up to the present time have used distribution methods based on two major principles.

The first method, which can be called the equitably distributed placement method, is based on the principle of distributing in each storage device pieces of objects whose size is proportional to the bandwidth of said storage device. This method therefore tends to fully exploit the bandwidth of the storage devices.

However, the drawback of this method is that some storage devices become full more rapidly than others, and that, consequently, as soon as a storage device is full, it is no longer possible to add pieces in the other storage devices without unbalancing the placement. Consequently, in most cases, this method does not enable the storage capacity of a heterogeneous group to be exploited fully. Although this loss of storage capacity is difficult to evaluate, since it is a function of the configuration, it has been shown that it is generally greater than 25% and can be as much as almost 80% of the storage capacity.

The second method, which can be called non-equitably distributed placement, is based on the principle of distributing the blocks of objects in such a way as to fully exploit the storage capacity of the group of storage devices, while attempting to balance the workload on these storage devices. However, the major drawback of this method is that this balance of the workload is unstable, owing to the variations in popularity of the objects which tend to perturb this balance.

Most of the work done on this method has therefore consisted in proposing solutions for rebalancing the workload. However, this rebalancing consumes bandwidth, and, in practice, leads to a reduction in the number of accesses which the storage devices can handle simultaneously.

In conclusion, this second method appears to enable the storage capacity to be exploited fully, but leads to a significant decrease in exploitation of the bandwidth (of the order of 50%, varying according to the rebalancing methods developed).

Up to the present time, all work done on methods for placing objects in heterogeneous groups of storage devices has aimed to improve one or other of the aforesaid placement methods, namely equitably distributed placement and non-equitably distributed placement.

However, because of the specific drawbacks linked to the design of each of these placement methods, all of this work has resulted in solutions in which either the storage capacity is not fully exploited or the bandwidth is exploited at a low level.

The present invention proposes to mitigate this drawback, and its principal object is to provide a method of distributing objects in heterogeneous storage devices which leads to the optimization of both the exploitation of storage capacity and the exploitation of the bandwidth of said storage devices.

For this purpose, the invention proposes a method of distributing objects in a heterogeneous group of storage devices, which uses as the parameter for managing the distribution of pieces of objects a coefficient, called the flexibility coefficient $CF(i)$, representative of the difference between the weights of the pieces of the object (i), when any new object is added, distributing the blocks of objects in said storage devices by specifying a given value of the flexibility coefficient, and for objects placed in the group of storage devices:
periodically measuring and calculating valves representative of the variability in popularity of each object,
for each object, calculating from the aforesaid values measured or calculated at the instant t, a desired flexibility coefficient $CFv(i)$ to be assigned to said object, according to a principle consisting in assigning to each object a flexibility coefficient inversely proportional to its variability in popularity,
for each object (i), measuring and calculating at the instant t, the real flexibility coefficient $CFr(i)$ of said object, representative of the difference between the weights of the pieces of said object,
and commanding a movement of blocks of pieces of objects between the storage devices so as to obtain, for each object (i), a real flexibility coefficient $CFr(i)$ corresponding to the desired flexibility coefficient $CFv(i)$ for this object.

The basic principle of the invention is therefore that of continually modifying, in a periodic way, the weights of the pieces of objects initially distributed in the different storage devices, using as the parameter for managing these movements a coefficient called the flexibility coefficient which is preferably inversely proportional to the variability in popularity.

According to this principle, the flexibility coefficient generally varies between two extreme values CF min and CF max, determining different placement modes:
if CF(i)=CF min, the weights of all the pieces of the object (i) are equal and the placement used is an equitably distributed placement;
if CF(i)=CF max, the object (i) consists of only one piece placed in a storage device, and the placement is therefore a pure non-equitably distributed placement;
between these two extremes, the different values of CF(i) allow the weights of the pieces to be modulated so as to obtain either a better balance of the load by making CF(i) approach CF min, or a better exploitation of the storage capacity by making CF(i) approach CF max.

The invention therefore consists in a hybrid placement method whose principal result is to place the objects having a stable popularity preferentially according to the non-equitably distributed placement method (CF(i) close to CF max), and to place the objects having an unstable popularity preferentially according to the equitably distributed placement method (CF(i) close to CF min).

In practice, simulations performed on groups of storage devices have shown that the method according to the invention yielded a rate of use of more than 80% in storage capacity and more than 85% in bandwidth.

In an advantageous embodiment, the real flexibility coefficient CFr(i) calculated for each object (i) is such that:

$$CFr(i)=Pdev(i)/Pmean(i)$$

where: Pmean(i) is the mean of the weights of the pieces of the object (i),
Pdev(i) is the standard deviation with respect to the mean of the weights of the pieces of the object (i).

In another advantageous embodiment:
in a preliminary stage, predetermined values of variability in popularity are assigned to the different blocks, said blocks are classified in decreasing order of variability in popularity, and the objects are created by the association of contiguously classified blocks;
and, in the course of the management of the group of storage devices, the blocks are reclassified periodically in decreasing order of variability in popularity according to the measured information on the popularity and variability of said blocks.

Since the method according to the invention consists, in particular, of calculating the ideal flexibility coefficient for each object (i) (desired flexibility coefficient), and therefore consists of working on objects, this advantageous embodiment, which results in the creation of objects consisting of blocks having very similar variability in popularity, enables the work on each of said objects to be done efficiently.

Additionally, and advantageously, for each object (i) the desired flexibility coefficient CFv(i) is determined by means of a decision method called the "decision trapezium", consisting of a trapezium having a first base consisting of a graduated axis whose vector is the variability in popularity of said object, and a second base consisting of a graduated axis whose vector is the desired flexibility coefficient for said object, said vector having the opposite direction to the preceding one, said decision method comprising the steps of:
specifying the ceiling and floor values of each of the variables, namely the variability in popularity and the desired flexibility coefficient, so as to produce a trapezium whose two sides consist of the segments [var ceiling-CF floor] and [var floor-CF ceiling] respectively,
if the variability is greater than or equal to var ceiling, projecting this variability onto the value CF floor of the flexibility coefficient;
similarly, if the variability is less than or equal to var floor, projecting this variability onto the value CF ceiling;
if the variability lies in the interval [var floor-var ceiling], linearly projecting this variability onto the interval [CF floor-CF ceiling].

This decision trapezium forms a decision tool which enables the desired flexibility coefficient for an object to be determined instantaneously from the variability in popularity of the object.

Additionally, this decision trapezium offers a flexibility of behavior due to the fact that the global behavior can be modified in accordance with the choices of the ceiling and floor values of variability in popularity and desired flexibility coefficients.

In another advantageous embodiment, and in order to obtain for each object (i) a real flexibility coefficient CFr(i) corresponding to the desired flexibility coefficient CFv(i):
a parameter called the CF distance, equal to the absolute value $|CFv(i)-CFr(i)|$, is calculated for each object (i);
for the objects (i) for which CFv(i)<CFr(i), and in the first place for the objects for which the CF distance is maximum, a block of these objects belonging to the piece of highest weight is moved towards the storage device containing the piece of lowest weight;
and, for the objects (i) for which CFv(i)>CFr(i), and in the first place for the objects for which the CF distance is maximum, a block of these objects is moved from the fullest storage device towards the least full storage device.

This mode of implementation, intended to impart to each object a real flexibility coefficient equal to the desired flexibility coefficient, results in a gain in bandwidth for objects whose real flexibility coefficient is decreasing, and a gain in storage capacity for objects whose real flexibility coefficient is increasing.

Additionally, this mode of implementation, which can be divided into two separate reconfiguration processes, according to whether CFv(i) is greater than or less than CFr(i), enables the desired result CFr(i)≅CFv(i) to be obtained with the use of a small percentage of the bandwidth of the storage device.

Moreover, the two aforesaid reconfiguration processes have separate working spaces and therefore cannot interfere with each other.

In another advantageous embodiment intended to mitigate any imbalance in the workload due to imperfections in the management of the distribution of the blocks of objects:
the most loaded storage device, called the hot SD, and the least loaded storage device, called the cold SD, are selected;
an infrequently accessed block, called a cold block, is found in the least loaded storage device, and a frequently accessed block, called a hot block, is found in the most loaded storage device, so that these two blocks can be exchanged to rebalance the load;
the hot blocks in the hot SD are sorted as follows:
the objects are classified in decreasing order of mean popularity,
after this classification, n most popular objects, forming a region called the high-popularity region, are selected, the n objects are broken down into blocks which are processed individually to sort them and distribute them in four classes:
- class 1: blocks for which the movement from the hot SD towards the cold SD decreases the real flexibility coefficient of the objects to which they belong,
- class 2: blocks moved towards a storage device other than the fullest storage device,
- class 3: blocks moved towards the fullest storage device,
- class 4: blocks whose movement increases the CF distance, in the same way, in order to sort the cold blocks in the cold SD, the n least popular objects are selected after classification, these objects forming a region called the region of low popularity, and are broken down into blocks which are processed individually to sort them and distribute them in the aforesaid four classes, after which, starting from these two groups of sorted blocks, namely the groups of hot blocks and cold blocks:
- the block in the hot SD to be transferred, consisting of a previously sorted block which is located in said hot SD and whose class number is lowest, is found,
- the block in the cold SD to be transferred, consisting of a previously sorted block which is located in said cold SD and whose class number is lowest, is found,
- and the selected block in the hot SD is exchanged with the selected block in the cold SD.

This "rebalancing" is thus designed to implement operations consisting in the exchange of the infrequently accessed blocks located in the less loaded storage devices with the frequently accessed blocks located in the highly loaded storage devices.

This rebalancing process thus enables the imbalances in workload to be reconfigured, while avoiding, or at least minimizing, any problem of interference with the reconfiguration processes.

The invention includes a device for applying the method according to the invention. The invention therefore relates to a device for distributing objects broken down into a plurality of blocks in a heterogeneous group of storage devices according to a distribution law consisting in distributing in said storage devices, of pieces of objects each consisting of a block or a plurality of blocks, said distribution device comprising:
- a module, called the analysis module, adapted for periodically measuring and calculating values representative of the variability in popularity of each object;
- a module, called the decision module, adapted for calculating for each object (i), from the parameters measured and calculated by the analysis module, at an instant t, a coefficient CFr(i), called the real flexibility coefficient, representative of the difference between the weights of the pieces of this object (i), and a coefficient CFv(i), called the desired flexibility coefficient, to be assigned to the object (i), and calculated according to a principle consisting in assigning to each object a flexibility coefficient inversely proportional to its variability in popularity;
- and a module, called the reconfiguration module, adapted for commanding a movement of blocks of pieces of objects between the storage devices, so as to obtain for each object (i) a real flexibility coefficient CFr(i) corresponding to the desired flexibility coefficient CFv(i) for this object.

Additionally, and advantageously, this distribution device comprises a module, called the rebalancing module, adapted for carrying out operations consisting in exchanging infrequently accessed blocks located in less loaded storage devices with frequently accessed blocks located in highly loaded storage devices.

Figure 2:
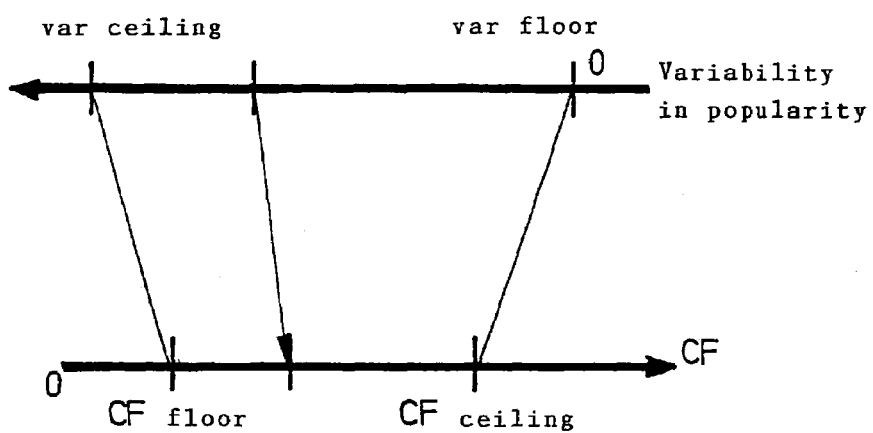
Figure 3:
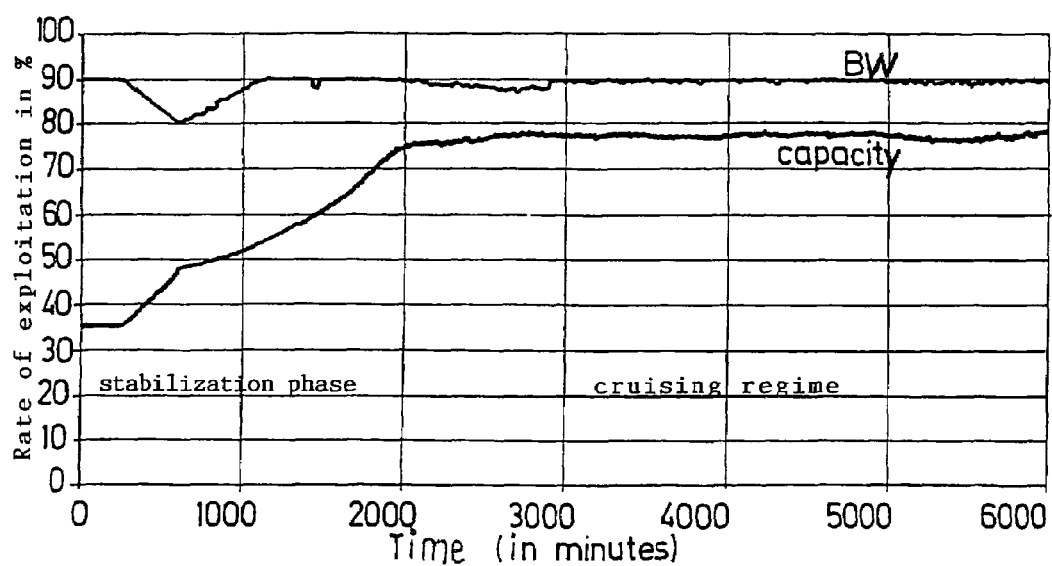

Other characteristics, objects and advantages of the invention will be made clear by the following detailed description which refers to the attached drawings which represent a preferred embodiment of the invention by way of example and without restrictive intent. In these drawings, FIG. 1 is a synoptic diagram of a device according to the invention, FIG. 2 is a diagram representing a mode of determining the desired flexibility coefficient CFv(i) for each object (i), and FIG. 3 is a graph representing the storage capacity exploited and the bandwidth exploited for a heterogeneous group of storage devices managed by a method according to the invention.

The device according to the invention shown in FIG. 1 is intended for the management of the placement of objects in a heterogeneous storage system 1 which conventionally comprises a controller 2 for managing said system, linked by an interconnection to a plurality of storage devices 3, 4.

This device comprises, in the first place, an analyzer 5 adapted to calculate, from measurements made on the heterogeneous system 1, the quality of the load balancing, the variability in popularity of the objects, the occupation of the storage capacity of the system, and the maintenance of service quality. It sends these estimates to the decision-making part 6 of an object flexibility controller 9.

The decision maker 6 monitors the variations in the estimates supplied by the analyzer 5 in such a way that a situation of overload or poor occupation of storage capacity can be rectified. It is designed to decide, for example, to decrease the flexibility of all the objects stored in the storage system 1 if the balance of the load is found to be degraded and thus to be leading to poor service quality. These decisions are sent to a statement of flexibility of the objects 7.

This flexibility statement 7 stores, for each object (i) stored in the storage system 1, its desired flexibility coefficient CFv(i), together with the real flexibility coefficient CFr(i). The flexibility statement 7 is updated according to the decisions of the decision maker 6 (which cause the modification of the desired flexibility coefficient) and according to the actions of the reconfiguration unit 8 described below (which cause the modification of the real flexibility coefficient).

The device also comprises, as mentioned above, a reconfiguration unit 8 adapted to move the data (by issuing input/output requests) in such a way that the real flexibility coefficient of the objects approaches the desired value set by the decision maker 6.

However, it should be noted that the decisions of the flexibility controller 9 cannot be perfect, for the following reasons:
- The analyzer 5 cannot make completely accurate and instantaneous measurements.
- The popularities are constantly changing: the work done by the flexibility controller 9 at any instant t is intended to resolve the problems of a situation measured at the instant t−1. This work will actually affect the performance of the system 1 at the instant t+1. If the popularities have changed between the instants t−1 and t+1, the flexible placement will not have an optimal effect, and therefore some of the load will be unbalanced.

There are no objects whose popularity remains constant. Therefore, as soon as a placement ceases to be equitably distributed for all the objects, an imbalance occurs.

This is why the flexible placement requires the support of a dynamic rebalancer 11. But, by contrast with what happens in the case of non-equitably distributed placement, the rebalancer has very little work to do: it only has to make up for the imbalance caused by the imperfections of the flexibility controller 9.

The quality of the flexible placement is therefore subject to the performance of four mechanisms, namely the decision maker 6, the reconfiguration unit 8, the rebalancer 11 and the analyzer 5.

To achieve this placement quality, these mechanisms must be designed so that:

they assign the correct flexibility coefficient to each object: this is because, if flexibility coefficients opposite to the required ones are used, the results may be considerably worse than those of non-equitably distributed placement;

they limit the reaction time of the flexibility controller to a minimum: the analyzer 5 detects changes in the way in which the system 1 reacts (period d1), then the decision maker 6 assigns the desired flexibility coefficients (period d2), then the reconfiguration unit 8 moves the data to provide a match between the desired flexibility coefficients and the real flexibility coefficients (period d3). d2 is very short, d1 is moderately short (some analyses require the monitoring of the system 1 for a certain time if they are to be appropriate), and d3 can be long if many reconfiguring movements are required. As d1+d2+d3 increases in length, the load becomes more unbalanced.

In order to meet these objectives, the operation of each of the hybrid placement mechanisms is described in detail below.

In the first place, the decision maker 6 processes the parameters measured and/or calculated by the analyzer 5, using the following criteria:

exploitation of the storage capacity: the free storage capacity should be well distributed, in other words its arrangement should maximize the quantity of data which can be added to the system 1 (given the initial flexibility coefficient of each newly stored object);

variability in popularity: the higher the variability of an object, the greater is the risk of unbalancing the load;

meeting the constraints of service quality: if the service quality constraints associated with an object are not met (for example, if a display screen is not served with a sufficient data rate, causing flickering), the service quality must be stabilized by decreasing the flexibility coefficient of this object, in such a way that it is equitably distributed and thus benefits from greater bandwidth. If the service quality of a set of objects is chaotic, it can be stabilized by globally decreasing the flexibility coefficient for all the objects;

quality of load balancing: if the global balance is poor, the global flexibility coefficient of the data must be decreased.

The decision maker 6 is therefore designed to calculate the ideal flexibility coefficient for each object (i), which will be the desired flexibility coefficient CFv(i).

In the first place, when the decision maker 6 is working on objects, and in order to optimize the decision mechanism, it is desirable for each object to consist of blocks having variabilities in popularity of the same order of magnitude.

For this purpose, values of variability in popularity, determined in a random way or as a function of measurements obtained from previous investigation, are assigned to the blocks in a preliminary step, and said blocks are classified in decreasing order of variability in popularity.

The objects are then created by the association of contiguously classified blocks. By way of example, the first object can consist of the first n classified blocks, the second object can consist of the following n blocks, and so on.

When this object creation has been completed, the system is started up, and the blocks are periodically reclassified in decreasing order of variability in popularity, according to the information on popularity and variability of the blocks acquired by the analyzer 5.

Similarly, the decision maker 6 works on objects whose content varies constantly, especially in an initial stabilization step, said objects consisting of blocks which can contain disparate data belonging to different files, but having very similar variability in popularity, enabling the decision maker 6 to work efficiently on each of the objects.

The decision method, which enables the desired flexibility coefficient to be determined for each object as a function of the variability in popularity monitored by the analyzer 5, is in turn based on the use of a "decision trapezium" shown in FIG. 2.

One of the bases of this trapezium consists of a graduated axis whose vector is the variability in popularity, while the second base consists of a graduated axis whose vector is the desired flexibility coefficient, said vector having a direction opposite that of the preceding one.

The first step of this decision method consists in specifying the ceiling and floor values of each of the variables, namely the variability in popularity and desired flexibility coefficient, so as to produce a trapezium shown in FIG. 2, whose two sides consist, respectively, of the segments [var ceiling-CF floor] and [var floor-CF ceiling].

When this decision trapezium has been defined, the decision method consists in the following steps:

if the variability is greater than or equal to var ceiling, this variability is projected onto the value CF floor of the flexibility coefficient; in other words, the desired flexibility coefficient of an object whose variability is greater than or equal to var ceiling is set at the value of CF floor;

similarly, if the variability is less than or equal to var floor, this variability is projected onto the value CF ceiling;

if the variability lies in the interval [var floor-var ceiling], this variability is projected linearly onto the interval [CF floor-CF ceiling].

This decision trapezium thus forms a decision tool which enables the desired flexibility coefficient for an object to be determined instantaneously from the variability in popularity of the object.

Additionally, the behavior of the decision maker 6 can be modified according to the choice of the ceiling and floor values of variability in popularity and desired flexibility coefficient.

Thus, by way of example:

an increase of the values CF floor and CF ceiling (a shift to the right in FIG. 2) leads to a global increase in the desired flexibility coefficients generated by the decision maker 6, and consequently to a better exploitation of the storage capacity with a penalty in terms of bandwidth;

conversely, a reduction of CF floor and CF ceiling leads to optimization of the exploitation of the bandwidth of the storage system, with a penalty in terms of its storage capacity; a similar argument can be made in respect of the values var ceiling and var floor;

a decrease of CF floor and an increase of CF ceiling (increase of the interval between these limits) will cause greater differentiation in the processing of the objects: the stable objects will be more easily "flexibilized" (by an increase in their real flexibility coefficient) and the variable objects will be more easily "rigidified" (by a decrease in their real flexibility coefficient). Consequently, the power of the flexibility controller 9 is increased. Conversely, this power of the flexibility controller 9 can also be decreased by bringing the two limits of the interval of flexibility coefficients closer together.

The decision trapezium thus enables the flexibility coefficient to be assigned to each object to be determined case by case, while also enabling the global policy for all the objects to be modified according to events intervening in the operation of the storage system 1.

Thus, for example, if a storage device 3 or 4 of the storage system 1 fails, some of the bandwidth is lost and the service quality can therefore no longer be maintained. In this case, the decision trapezium can be modified to gain bandwidth, with a penalty in terms of storage capacity, so as to re-establish acceptable service quality temporarily while the defective storage device is replaced.

Secondly, the reconfiguration unit 8 is adapted to act in such a way that the real flexibility coefficient CFr(i) of each object (i) is equal to the desired flexibility coefficient CFv(i) determined by the decision maker 6, in order to gain bandwidth for objects whose real flexibility coefficient decreases, and to gain storage capacity for objects whose real flexibility coefficient increases.

For this purpose, in the first place, the operation method of this reconfiguration unit 8 uses a parameter called the "CF distance", equal to the absolute value |CFv(i)−CFr(i)|.

This operating method can be divided into two processes:

a reconfiguration process, called BW reconfiguration, which is designed to gain bandwidth and is applied to the objects whose desired CF is less than the real CF, and which therefore need to be rigidified; for this purpose, this process consists in moving, for the object to be rigidified, a block belonging to the piece having the highest weight towards the storage device containing the piece having the lowest weight; this process is also designed to process, in the first place, the objects whose CF distance is largest;

a reconfiguration process, called SC reconfiguration, which is designed to gain storage capacity, and is applied to the objects whose desired CF is greater than the real CF, and which therefore need to be flexibilized; for this purpose, this process consists in selecting the objects having a maximal CF distance and moving a block of these objects from the fullest storage device towards the least full storage device.

This choice of two separate processes makes it possible to exploit the decision capacities of the decision maker 6 well, while using a small percentage of the bandwidth of the storage system. It should also be noted that the BW reconfiguration process works on objects which have to be rigidified, whereas the SC reconfiguration process works on objects which have to be flexibilized. Consequently, these two processes have separate work spaces and therefore cannot interfere with each other.

Finally, the objective of the rebalancer 11, as mentioned above, is to mitigate the imbalances in workload arising from the imperfections of the flexibility controller 1.

The rebalancing method is designed to provide, for this purpose, operations consisting in exchanging infrequently accessed blocks (cold blocks) located in less loaded storage devices (cold SDs) with frequently accessed blocks (hot blocks) located in highly loaded storage devices (hot SDs).

This rebalancing method, being completely separate from the reconfiguration, has to be designed to avoid or at least minimize any problem of interference with the reconfiguration processes, particularly the BW reconfiguration process, and therefore operates in a special way.

This rebalancing method requires a special classification method which changes according to the information transmitted by the analyzer 5, and which is explained below.

In the first place, the most highly loaded storage device (hot SD) and the least loaded storage device (cold SD) are selected.

In order to move a hot block from the hot SD towards the cold SD, the objects are classified in decreasing order of mean popularity, and the n most popular objects are selected after this classification, where n is predetermined and is for example equal to 25, forming a "high region" of popularity.

These selected objects are then broken down into blocks which are then processed individually by being sorted and distributed in the following four classes:

class 1: blocks whose movement from the hot SD towards the cold SD decreases the real flexibility coefficient of the objects to which they belong, thus leading to a rigidification of these objects. This class 1 therefore relates to the blocks which create no risk of conflict with the BW reconfiguration;

class 2: blocks moved towards a storage device other than the fullest storage device (in other words, when the cold SD differs from the fullest storage device); this class 2 therefore relates to the blocks which create no risk of conflict with the SC reconfiguration;

class 3: blocks moved towards the fullest storage device (the class opposite to class 2), and therefore capable of creating a risk of conflict with the SC reconfiguration;

class 4: blocks whose movement increases the CF distance (the class opposite to class 1), and which may create risks of conflict with the BW reconfiguration.

In the same way, in order to process the movement of a cold block from the cold SD towards the hot SD, an identical classification into the same four classes is carried out for the blocks of the n least popular objects forming a "low popularity" region.

After this classification, the steps of the balancing method are as follows:

1) Finding the block in the hot SD to be transferred, this block belonging to an object classified in the high popularity region. For this purpose, the block having the lowest class number (class 1 taking priority), and whose object has a minimal CF distance, in the hot SD is chosen. It should be noted that this choice of a minimal CF distance leads, in particular, to a decrease in the risk of conflict with the SC reconfiguration for the blocks located in class 3, and with the BW reconfiguration for the objects located in class 4, since these reconfigurations lead to the movement of virtually only the data of the objects having a large CF distance.

2) Finding the block in the cold SD to be transferred, this block belonging to an object classified in the low popularity region (the finding process being similar to that of step 1) above).

3) Exchanging the block in the hot SD selected in step 1) above with the block in the cold SD selected in step 2) above.

The design of the flexibility controller 9, leading to "flexible placement", combined with this rebalancing process, leads to simultaneous optimization of the exploitation of the storage capacity and the exploitation of the bandwidth of the storage systems, as shown in the example of use described below with reference to FIG. 3.

The storage system 1 which was used consisted of two hard disks having a storage capacity of 18.6 GB and a bandwidth of 34.2 MB/s, and two hard disks having a storage capacity of 43 GB and a bandwidth of 28.8 MB/s.

In FIG. 3, which illustrates the results, the operating time in minutes is shown on the abscissa, while the rates of exploitation of the bandwidth and of the storage capacity are shown on the ordinate.

At the start of operation, the storage system 1 is filled in a random way. As shown by the curve of FIG. 3, during an initial stabilization phase the flexibility controller 9 tends to release storage capacity while stabilizing the bandwidth as well as possible. Subsequently, the information supplied by the analyzer 5 become progressively more accurate and more representative of the characteristics of the objects, enabling the decision maker 6 to calculate desired flexibility coefficients which are increasingly appropriate.

For each object, these desired flexibility coefficients also gradually approach the values of the real flexibility coefficients, as a result of the action of the reconfiguration unit 7.

At the end of this stabilization phase, the flexibility controller 9 provides a cruising regime in which a 77% rate of use of the storage capacity and an 89% rate of use of bandwidth are achieved.

By way of comparison, an "equitably distributed" placement provides, in the same conditions, a 100% rate of use of the bandwidth, but only a 35% rate of use of the storage capacity.

Consequently, by comparison with the known placement methods, the "flexible interlacing" according to the invention provides high rates of use of both bandwidth and storage capacity, and does not lead to a "sacrifice" of one of these rates of use in favor of the other.

The invention claimed is:

1. A method of distributing objects in a heterogeneous group of data storage devices, the method comprising the steps of: breaking down each object into a plurality of blocks, distributing said blocks in the different storage devices in accordance with a distribution law which consists in distributing, in each of said storage devices, pieces of objects consisting each of one or of a plurality of blocks, the said method being characterized in that it uses as the parameter for managing the distribution of pieces of objects a coefficient, called the flexibility coefficient $CF(i)$, representative of the difference between the weights of the pieces of the object (i), and characterized in that it comprises the steps of: when any new object is added, distributing the blocks of objects in said storage devices by specifying a given value of the flexibility coefficient, and for objects placed in the group of storage devices:

periodically measuring and calculating values representative of the variability in popularity of each object, for each object, calculating from the aforesaid values measured or calculated at the instant t, a desired flexibility coefficient $CFv(i)$ to be assigned to said object, according to a principle consisting in assigning to each object a flexibility coefficient inversely proportional to its variability in popularity, for each object (i), measuring and calculating at the instant t, the real flexibility coefficient $CFr(i)$ of said object, representative of the difference between the weights of the pieces of said object, and commanding a movement of blocks of pieces of objects between the storage devices so as to obtain, for each object (i), a real flexibility coefficient $CFr(i)$ corresponding to the desired flexibility coefficient $CFv(i)$ for this object.

2. The distribution method as claimed in claim 1, wherein the real flexibility coefficient $CFr(i)$ calculated for each object (i) is such that:

$$CFr(i)=Pdev(i)/Pmean(i)$$

where: $Pmean(i)$ is the mean of the weights of the pieces of the object (i), and
$Pdev(i)$ is the standard deviation with respect to the mean of the weights of the pieces of the object (i).

3. The distribution method as claimed in claim 1, wherein:
in a preliminary stage, predetermined values of variability in popularity are assigned to the different blocks, said blocks are classified in decreasing order of variability in popularity, and the objects are created by the association of contiguously classified blocks;

and, in the course of the management of the group of storage devices, the blocks are reclassified periodically in decreasing order of variability in popularity according to the measured information on the popularity and variability of said blocks.

4. The distribution method as claimed in claim 1, wherein the desired flexibility coefficient $CFv(i)$ is determined for each object (i) by means of a decision method called the "decision trapezium", consisting of a trapezium having a first base consisting of a graduated axis whose vector is the variability in popularity of said object, and a second base consisting of a graduated axis whose vector is the desired flexibility coefficient for said object, said vector having the opposite direction to the preceding one, said decision method comprising the steps of:

specifying the ceiling and floor values of each of the variables, namely the variability in popularity and the desired flexibility coefficient, so as to produce a trapezium whose two sides consist of the segments [var ceiling-CF floor] and [var floor-CF ceiling] respectively, if the variability is greater than or equal to var ceiling, projecting this variability onto the value CF floor of the flexibility coefficient;

similarly, if the variability is less than or equal to var floor, projecting this variability onto the value CF ceiling;

if the variability lies in the interval [var floor-var ceiling], linearly projecting this variability onto the interval [CF floor-CF ceiling].

5. The distribution method as claimed in claim 1, wherein, in order to obtain for each object (i) a real flexibility coefficient $CFr(i)$ corresponding to the desired flexibility coefficient $CFv(i)$:

a parameter called the CF distance, equal to the absolute value $|CFv(i)-CFr(i)|$, is calculated for each object (i);

for the objects (i) for which $CFv(i)<CFr(i)$, and in the first place for the objects for which the CF distance is maximum, a block of these objects belonging to the piece of highest weight is moved towards the storage device containing the piece of lowest weight;

and, for the objects (i) for which $CFv(i)>CFr(i)$, and in the first place for the objects for which the CF distance is maximum, a block of these objects is moved from the fullest storage device towards the least full storage device.

6. The distribution method as claimed in claim 1, wherein:
the most loaded storage device, called the hot SD, and the least loaded storage device, called the cold SD, are selected;
an infrequently accessed block, called a cold block, is found in the least loaded storage device, and a frequently accessed block, called a hot block, is found in the most loaded storage device, so that these two blocks can be exchanged to rebalance the load;
the hot blocks in the hot SD are sorted as follows:
the objects are classified in decreasing order of mean popularity,
after this classification, n most popular objects, forming a region called the high-popularity region, are selected,
the n objects are broken down into blocks which are processed individually to sort them and distribute them in four classes:
class 1: blocks for which the movement from the hot SD towards the cold SD decreases the real flexibility coefficient of the objects to which they belong,
class 2: blocks moved towards a storage device other than the fullest storage device,
class 3: blocks moved towards the fullest storage device,
class 4: blocks whose movement increases the CF distance,
in the same way, in order to sort the cold blocks in the cold SD, the n least popular objects are selected after classification, these objects forming a region called the region of low popularity, and are broken down into blocks which are processed individually to sort them and distribute them in the aforesaid four classes,
after which, starting from these two groups of sorted blocks, namely the groups of hot blocks and cold blocks:
the block in the hot SD to be transferred, consisting of a previously sorted block which is located in said hot SD and whose class number is lowest, is found,
the block in the cold SD to be transferred, consisting of a previously sorted block which is located in said cold SD and whose class number is lowest, is found,
and the selected block in the hot SD is exchanged with the selected block in the cold SD.

7. A device for distributing objects (i) broken down into a plurality of blocks in a heterogeneous group (1) of storage devices (3, 4) according to a distribution law consisting in distributing, in said storage devices, pieces of objects each consisting of a block or a plurality of blocks, said distribution device being characterized in that it comprises:
a module, called the analysis module (5), adapted for periodically measuring and calculating values representative of the variability in popularity of each object;
a module, called the decision module (6), adapted for calculating for each object (i), from the parameters measured and calculated by the analysis module (5), at a instant t, a coefficient CFr(i), called the real flexibility coefficient, representative of the difference between the weights of the pieces of this object (i), and a coefficient CFv(i), called the desired flexibility coefficient, to be assigned to the object (i), and calculated according to a principle consisting in assigning to each object a flexibility coefficient inversely proportional to its variability in popularity;
and a module, called the reconfiguration module (8), adapted for commanding a movement of blocks of pieces of objects between the storage devices, so as to obtain for each object (i) a real flexibility coefficient CFr(i) corresponding to the desired flexibility coefficient CFv(i) for this object.

8. The distribution device as claimed in claim 7, wherein it comprises a module, called the rebalancing module (11), adapted for carrying out operations consisting in exchanging infrequently accessed blocks located in less loaded storage devices with frequently accessed blocks located in highly loaded storage devices.

* * * * *